(12) United States Patent
Chen et al.

(10) Patent No.: US 8,014,512 B2
(45) Date of Patent: Sep. 6, 2011

(54) METHOD AND SYSTEM FOR USER INTERACTION WITHIN A QUEUE

(75) Inventors: Yen-Fu Chen, Austin, TX (US); Fabian F. Morgan, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 11/736,702

(22) Filed: Apr. 18, 2007

(65) Prior Publication Data
US 2008/0260138 A1 Oct. 23, 2008

(51) Int. Cl.
*H04N 3/00* (2006.01)
(52) U.S. Cl. .......... 379/266.01; 379/266.03; 379/265.09
(58) Field of Classification Search ............. 379/265.02, 379/265.09, 265.1, 265.11, 266.01, 266.02, 379/266.03, 266.04
See application file for complete search history.

(56) References Cited

U.S. PATENT DOCUMENTS

| | | | |
|---|---|---|---|
| 4,788,715 A * | 11/1988 | Lee ................................. 379/84 |
| 5,012,510 A | 4/1991 | Schaubs et al. |
| 5,732,132 A | 3/1998 | Hamada |
| 5,832,061 A | 11/1998 | Rubin |
| 5,875,240 A | 2/1999 | Silverman |
| 5,903,642 A | 5/1999 | Schwartz et al. |
| 6,049,601 A | 4/2000 | Orui |
| 6,070,241 A | 5/2000 | Edwards et al. |
| 6,222,920 B1 | 4/2001 | Walker et al. |
| 6,330,327 B1 | 12/2001 | Lee et al. |
| 6,373,940 B2 | 4/2002 | Shaffer et al. |
| 6,389,028 B1 | 5/2002 | Bondarenko et al. |
| 6,556,662 B1 | 4/2003 | Miller et al. |
| 6,608,890 B1 | 8/2003 | Schulz et al. |
| 6,631,187 B1 | 10/2003 | Juhola et al. |
| 6,826,276 B2 | 11/2004 | Brown et al. |
| 6,856,678 B2 | 2/2005 | Catley et al. |
| 6,904,138 B1 | 6/2005 | Loebig |
| 6,959,081 B2 | 10/2005 | Brown et al. |
| 7,020,256 B2 | 3/2006 | Jain et al. |
| 7,050,567 B1 | 5/2006 | Jensen |
| 7,050,568 B2 | 5/2006 | Brown et al. |
| 7,095,842 B2 | 8/2006 | Brown et al. |

(Continued)

OTHER PUBLICATIONS

U.S. Appl. No. 11/558,600, filed Nov. 13, 2006, Chen et al.

(Continued)

*Primary Examiner* — Ahmad F Matar
*Assistant Examiner* — Antim Shah
(74) *Attorney, Agent, or Firm* — Yee and Associates, P.C.; Mark C. Vallone

(57) ABSTRACT

A system for providing caller interaction within a queue. In response to receiving a call, it is determined whether a wait time exists before a caller is connected to a customer service representative. In response to determining that the wait time exists, it is determined whether the caller is interested in an interaction. In response to determining that the caller is interested in the interaction, a profile associated with the caller is loaded. In response to detecting a connection with an interactive system, interactive options are loaded from the interactive system and presented to the caller based on the profile. In response to receiving a selection from the interactive options, it is determined whether the selection includes a group interaction. In response to determining that the selection includes the group interaction, the group interaction is loaded based on the profile. Then, the caller is entered into the group interaction.

11 Claims, 5 Drawing Sheets

U.S. PATENT DOCUMENTS

| | | |
|---|---|---|
| 7,130,411 B2 | 10/2006 | Brown et al. |
| 7,162,514 B2 | 1/2007 | Hirai |
| 7,233,651 B2 | 6/2007 | Bull et al. |
| 7,251,318 B1 | 7/2007 | Henderson |
| 7,437,413 B2 | 10/2008 | Okuyama et al. |
| 7,533,418 B1 | 5/2009 | Yoakum et al. |
| 7,606,351 B2 | 10/2009 | Niwa |
| 7,664,242 B2 | 2/2010 | Finkelman et al. |
| 2003/0103618 A1 | 6/2003 | Brown et al. |
| 2003/0108185 A1* | 6/2003 | Brown et al. ............ 379/266.01 |
| 2003/0108186 A1* | 6/2003 | Brown et al. ............ 379/266.01 |
| 2003/0174830 A1* | 9/2003 | Boyer et al. ............ 379/265.02 |
| 2004/0137323 A1 | 7/2004 | Lang |
| 2004/0170258 A1 | 9/2004 | Levin et al. |
| 2005/0125344 A1 | 6/2005 | Utsumi |
| 2005/0254636 A1 | 11/2005 | Niwa |
| 2006/0126810 A1 | 6/2006 | Wilson et al. |
| 2006/0239434 A1 | 10/2006 | Acharya |
| 2006/0273920 A1 | 12/2006 | Doan et al. |
| 2007/0253544 A1 | 11/2007 | Bookstaff |
| 2007/0291925 A1 | 12/2007 | Goldman et al. |
| 2008/0188202 A1 | 8/2008 | Maeng |
| 2008/0304647 A1 | 12/2008 | Ikemori et al. |
| 2009/0017806 A1 | 1/2009 | Hayakawa et al. |
| 2009/0092233 A1 | 4/2009 | Meli et al. |
| 2010/0042674 A1 | 2/2010 | Pantalone et al. |
| 2010/0120453 A1 | 5/2010 | Tamchina et al. |

OTHER PUBLICATIONS

U.S. Appl. No. 11/553,085, filed Oct. 26, 2006, Chen et al.
U.S. Appl. No. 11/550,167, filed Oct. 17, 2006, Chen et al.
U.S. Appl. No. 11/538,879, filed Oct. 5, 2006, Chen et al.
USPTO office action for U.S. Appl. No. 11/550,167 dated Aug. 20, 2010.
USPTO notice of allowance for U.S. Appl. No. 11/550,167 dated Aug. 20, 2010.
USPTO office action for U.S. Appl. No. 11/558,600 dated Sep. 2, 2010.
USPTO notice of allowance for U.S. Appl. No. 11/558,600 dated Jan 5, 2011.
USPTO office action for U.S. Appl. No. 11/538,879 dated May 27, 2010.
USPTO notice of allowance for U.S. Appl. No. 11/538,879 dated Sep. 21, 2010.
USPTO office action for U.S. Appl. No. 11/553,085 dated May 27, 2010.
USPTO notice of allowance for U.S. Appl. No. 11/553,085 dated Sep. 16, 2010.

* cited by examiner

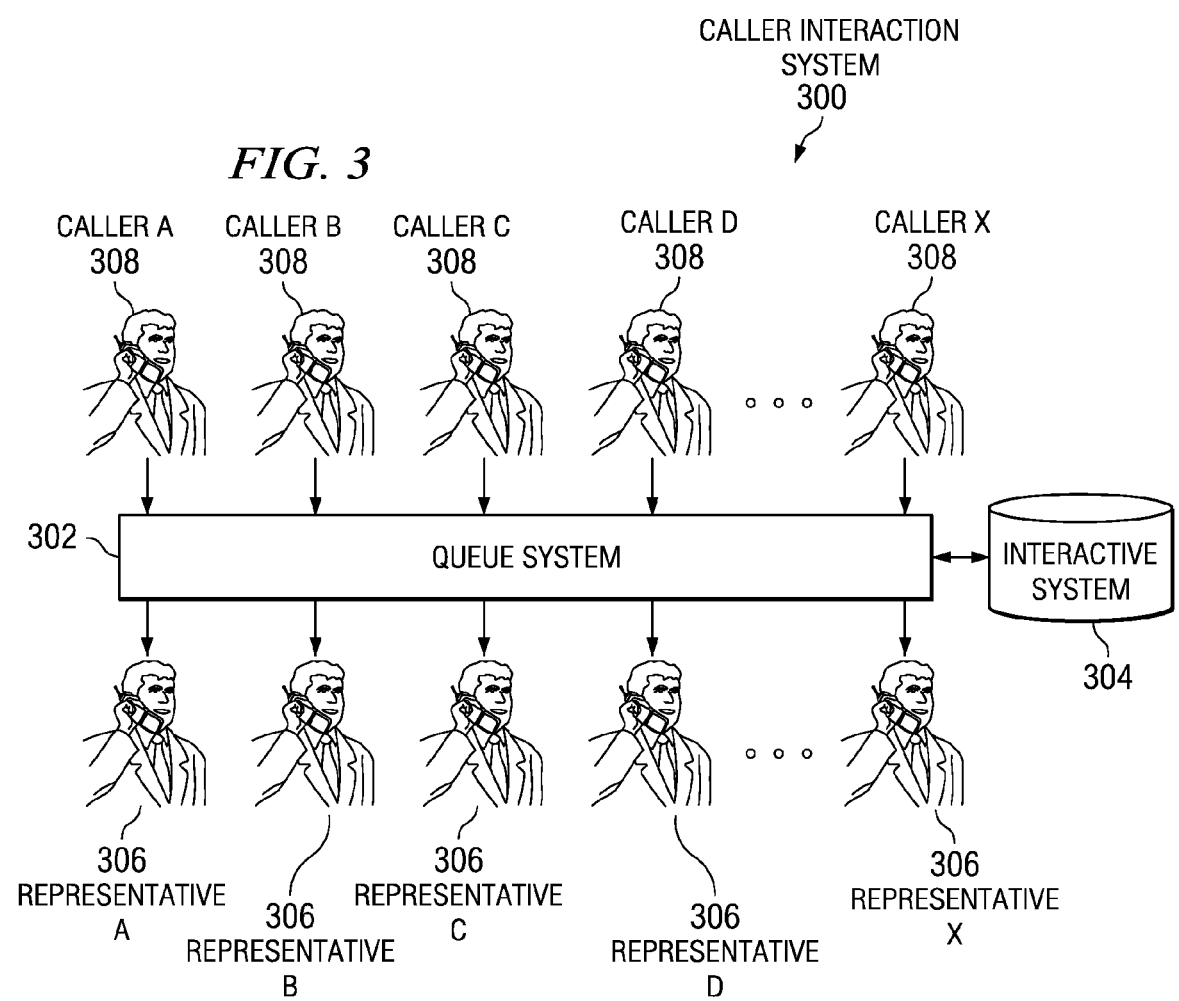

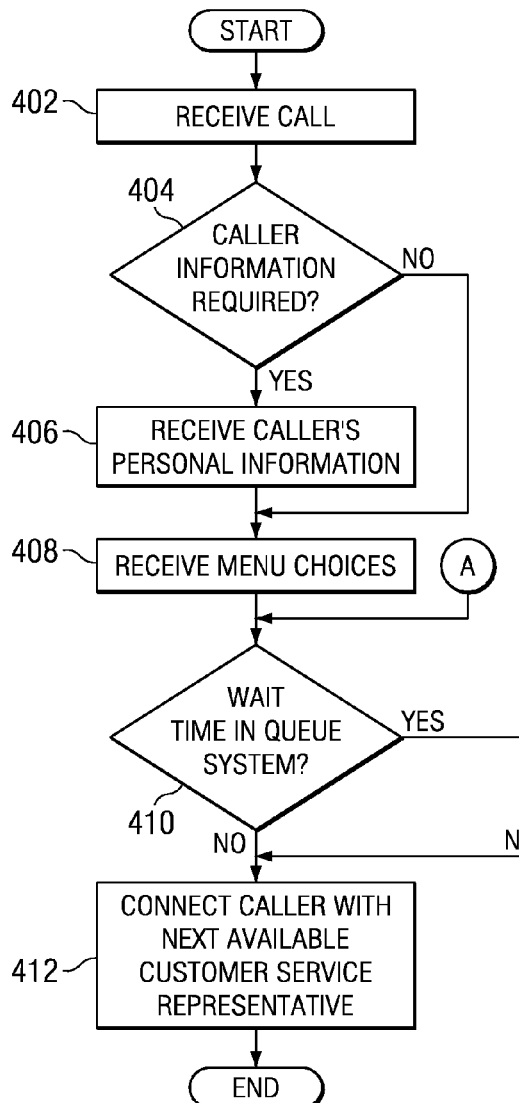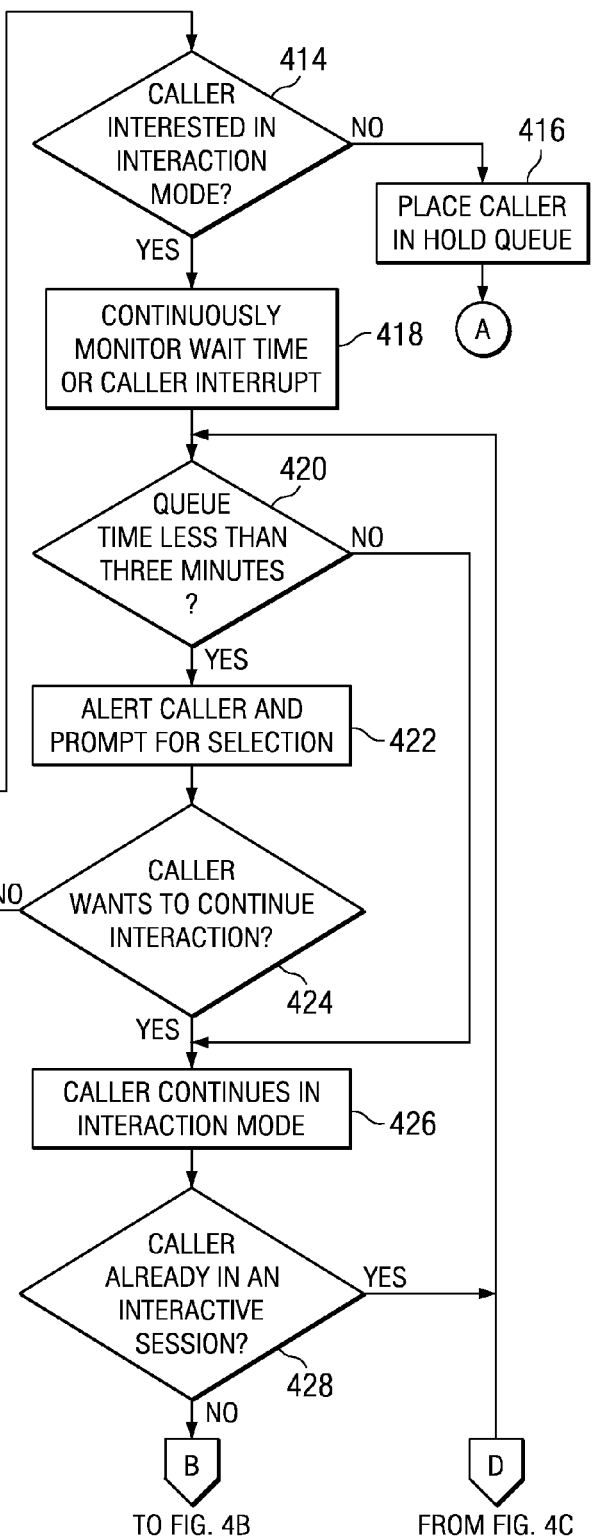
FIG. 4A

METHOD AND SYSTEM FOR USER INTERACTION WITHIN A QUEUE

BACKGROUND OF THE INVENTION

1. Field of the Invention

The present invention relates generally to an improved communication device. More specifically, the present invention is directed to a computer implemented method, system, and computer usable program code for providing interaction among a plurality of communication device users within a queue system.

2. Description of the Related Art

Today, telephones are one of the most widely-used communication tools in the world. In the early stages of development, telephones were merely a convenient tool to allow people to communicate while physically separated. Currently, however, many organizations use telephones to market products and services, provide technical support to customers, allow customers to access financial data, and much more. Thus, telephone systems have become a widely used major business tool.

Telephone call centers have been developed in order to bring about effective use of telephone systems for business purposes. Typically, a call center has a large number of customer service representatives to handle telephone communication with customers. As telephone access to customer service staff increases, problems associated with waiting on hold also has increased. Problems include, for example, excessively long wait times, full hold queues that cannot accept additional callers, and accidental call disconnects. These types of hold queue problems engender a high level of caller frustration and ill will.

One method used by businesses today to decrease caller frustration is to inform calling customers as to the current estimated wait time before a customer service representative is available to take the call. However, even though the calling party is informed of an extended wait time for a customer service representative to answer the call, the calling party may still choose to wait in the hold queue with nothing to do but listen to prerecorded music or messages, which the calling party may not desire to hear.

Therefore, it would be beneficial to have an improved computer implemented method, system, and computer usable program code for providing interaction among communication device users while the users wait in a hold queue for an extended period of time.

SUMMARY OF THE INVENTION

Illustrative embodiments provide a computer implemented method, system, and computer usable program code for providing caller interaction within a queue. In response to receiving a call from a caller, it is determined whether a wait time exists before the caller is connected to a customer service representative. In response to determining that the wait time exists, it is determined whether the caller is interested in an interaction. In response to determining that the caller is interested in the interaction, a profile associated with the caller is loaded.

In response to detecting a connection with an interactive system, interactive options are loaded from the interactive system based on the profile associated with the caller. The interactive options are presented to the caller. In response to receiving a selection from the interactive options from the caller, it is determined whether the selection includes a group interaction with other callers within the queue. In response to determining that the selection includes the group interaction with other callers within the queue, the group interaction is loaded based on the profile associated with the caller. Then, the caller is entered into the group interaction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary illustration of caller interactive queue system in accordance with an illustrative embodiment; and FIGS. 4A-4C are diagrams of a flowchart illustrating an exemplary process for providing an interactive system to communication device users waiting in a hold queue in accordance with an illustrative embodiment.

DETAILED DESCRIPTION OF THE PREFERRED EMBODIMENT

Figure 1:
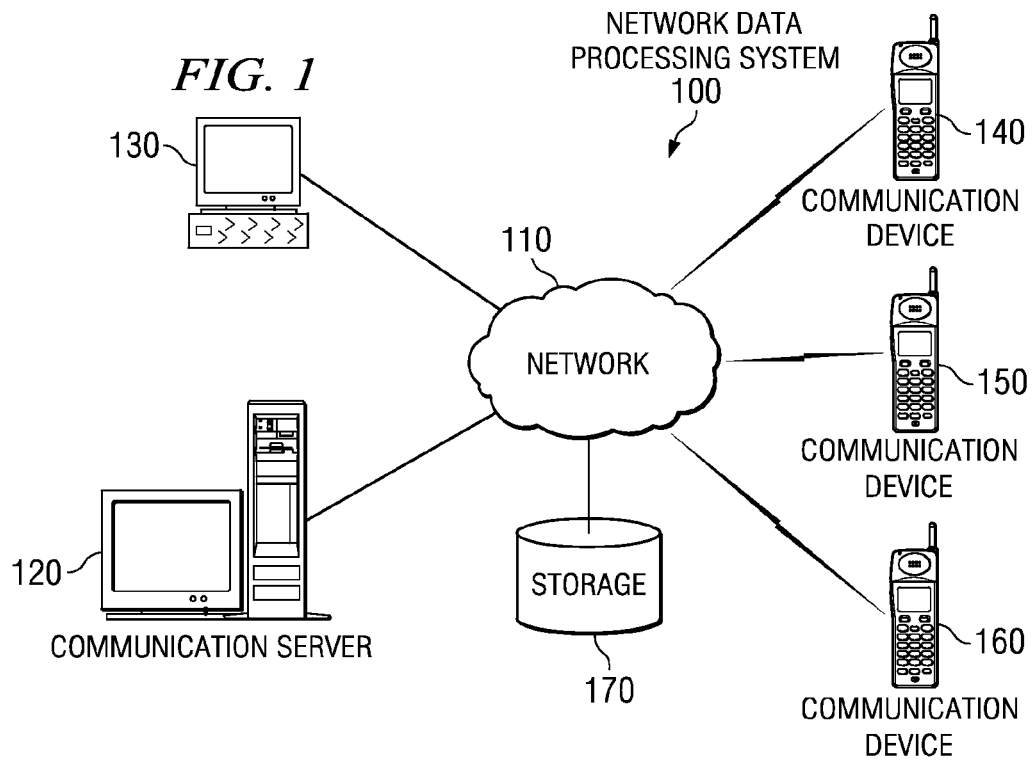
FIG. 1 is a pictorial representation of a network of data processing systems in which illustrative embodiments may be implemented.

With reference now to the figures, FIG. 1 depicts a pictorial representation of a network of data processing systems in which illustrative embodiments may be implemented. Network data processing system 100 is a network of computers in which illustrative embodiments may be implemented. Network data processing system 100 contains network 110, which is the medium used to provide communication links between various computers and other devices coupled together within network data processing system 100. Network 110 may include several types of connections, such as wire, wireless communication links, or fiber optic cables. However, for this illustrative embodiment depicted in FIG. 1, wireless communication links are emphasized.

In the depicted example of FIG. 1, communication server 120 is coupled to network 110 by wire or wireless communication links. Communication server 120 may, for example, be a communication server with high speed connections to network 110. Also, communication server 120 may represent a plurality of communication servers located within a local area network (LAN) or a wide area network (WAN). Further, communication server 120 may, for example, reside within a cellular telephone service provider (SP) network. In another illustrative embodiment, communication server 120 may, for example, independently provide communication services for a plurality of cellular telephone SP networks.

Communication devices 130, 140, 150, and 160, along with storage unit 170, also are coupled to network 110 via wire or wireless links. In addition, communication devices 130, 140, 150, and 160 are clients to communication server 120. In this illustrative example, communication device 130 is a personal computer using a conventional land line communication link, and communication devices 140, 150, and 160 are cellular telephones relying on wireless communication links.

However, it should be noted that besides being personal computers and cellular telephones, the communication devices shown in FIG. 1 may, for example, be personal digital assistants (PDAs), handheld computers, or laptop computers. Furthermore, illustrative embodiments are not restricted to the above-listed communication devices. Illustrative embodiments may utilize any communication device that is capable of accomplishing processes of illustrative embodiments.

Storage unit 170 represents any type of storage device that is capable of storing data in a structured and/or unstructured format. Also, storage unit 170 may represent a plurality of storage units coupled to network 110. Storage unit 170 may, for example, be a database for a cellular telephone SP network that contains customer information, such as customer names, addresses, telephone numbers, and personal profile data.

Additionally, network data processing system 100 may, for example, include additional servers, clients, storage units, and other devices not shown. Moreover, network data processing system 100 may, for example, represent the Internet with network 110 representing a worldwide collection of networks and gateways that use the transmission control protocol/internet protocol (TCP/IP) suite of protocols to communicate with one another. Internet protocol (IP) telephony is the two-way transmission of voice over a packet-switched IP network, which is part of the TCP/IP suite of protocols. The terms "IP telephony" and "voice over IP" (VoIP) are synonymous. VoIP is a telephone service that uses the Internet as a global telephone network. At the heart of the Internet is a backbone of high-speed data communication lines between major nodes or host computers, consisting of thousands of commercial, government, educational, and other computer systems that route data and messages.

It should be appreciated by those of ordinary skill in the art that FIG. 1 is only intended as an exemplary illustration and is not intended as an architectural limitation for illustrative embodiments. Further, it should be appreciated by those of ordinary skill in the art that even though the example of FIG. 1 depicts a telephone network, businesses may, for example, use illustrative embodiments for on-line customer service representatives on an instant messaging network or other network system that utilizes a hold queue system.

Illustrative embodiments provide a computer implemented method, system, and computer usable program code to provide interaction among communication device users that are waiting in a hold queue system. In response to receiving a call from a caller, a queue system determines whether a wait time exists before the queue system connects the caller with a customer service representative. In response to determining that the wait time exists, the queue system determines whether the caller is interested in an interaction, such as gaming or chatting. In response to determining that the caller is interested in the interaction, the queue system loads a profile associated with the caller.

In response to detecting a connection with an interactive system, the queue system loads interactive options from the interactive system based on the profile associated with the caller. Afterward, the queue system presents the interactive options to the caller via a display or an audio output device on the caller's communication device. In response to receiving a selection from the interactive options, the queue system determines whether the selection includes a group interaction with other callers in the wait queue. In response to determining that the selection includes the group interaction, the queue system loads the group interaction based on the profile associated with the caller. Then, the queue system enters the caller into the group interaction.

In addition, in response to continuously monitoring the caller's wait time in the wait queue, the queue system determines if the wait time is less than a predetermined alert time, such as, for example, three minutes. In response to determining that the caller's wait time in the queue is less than the predetermined alert time, the queue system alerts the caller that the wait time is less than the exemplary three minutes.

In response to alerting the caller, the queue system determines whether the caller wants to continue with the interaction even though the wait time is almost over. In response to determining that the caller does not want to continue with the interaction, the queue system connects the caller with a next available customer service representative based on a need of the caller.

Illustrative embodiments provide a user of a communication device with the ability to interact with other callers, such as talking to or playing games locally or via a network with the other callers, while the users/callers are in a telephone hold queue. Thus, illustrative embodiments provide fun entertainment for callers waiting in telephone hold queues. As a result, illustrative embodiments may reduce caller frustration and improve a caller's mood prior to talking with a customer service representative. Consequently, a business utilizing illustrative embodiments may increase overall customer satisfaction.

Illustrative embodiments provide user interaction and gaming within queued systems that may, for example, be applied to IP telephony, cellular telephony, LAN-line telephony, global positioning system (GPS) technology, Bluetooth® technology, wireless technology, land-line telephony, and instant messaging. In addition, illustrative embodiments may be applied to any Web queuing system, such as on-line customer service representatives using instant messaging or similar applications. IP telephony allows illustrative embodiments to extend to other computer networking games, forums, chatrooms, Second Life®, etc. Second Life® is an Internet-based virtual world that enables users, called "residents," to interact with each other through avatars.

Illustrative embodiments may be implemented by a business so that a caller's communication device is simply conferenced or networked to a gaming/interaction service provider when the caller is placed in a hold queue temporarily, short-term, or long-term. The gaming/interaction service provider will seek a caller's consent prior to entering the caller in a game or chat. In addition, illustrative embodiments may, for example, leverage factors, such as a caller's personal profile information, estimated wait time in the hold queue, service/problem category, geological location, or other personal and demographic information, to organize chat groups or games.

If an estimated hold queue wait time precludes a caller from participating well in a gaming or interaction environment, which may be determined by a system administrator, illustrative embodiments may disable certain features or possibly not even offer a gaming/interaction choice to a caller. Moreover, illustrative embodiments may offer a caller the option to stay in the hold queue longer if the caller is enjoying the game or simply wanting to finish the game. Illustrative embodiments may handle prioritization of hold queue entries based on each caller's personal information.

An example of gaming with other callers in a hold queue may comprise of the gaming/interaction service provider selecting two or more callers at random, first making sure the callers previously agreed to play the game, and then asking trivia questions to see which caller can answer the most questions in the time the callers wait in the hold queue. A caller that knows an answer to a trivia question may input the answer selection into the communication device. The first caller submitting an answer gets to respond to the question. If the first responder gets the answer right, the first responder gets a point. If the first responder gets the answer wrong, one of the other callers get an opportunity to respond. The goal of the trivia game is to answer the most questions correctly before exiting the hold queue. Consequently, the gaming/interaction service provider needs to select callers with similar hold times for this game type to be effective.

An example of talking to other callers in the hold queue may involve directing callers to a "chatroom," if callers so choose, where callers may discuss whatever is on their mind, such as the weather, sporting events, current news stories, the quality of service provided by the company the callers are waiting to talk to, etc.

Also, this caller interaction may be useful in the domain of technical support where the gaming/interaction service provider allows callers in the same service problem category to talk to other callers. In this situation, callers may be able to leverage each other's past experience and knowledge to come up with a solution for a caller's particular problem prior to the caller speaking with a customer service representative. Thus, this type of caller interaction may save a business money by decreasing the number of callers that speak with customer service representatives.

Further, illustrative embodiments may implement landline telephony differently from IP telephony. In a land-line telephony implementation, illustrative embodiments may send a user a message stating that the estimated wait time in a particular hold queue is 20 minutes due to a higher than normal call volume. Then, illustrative embodiments may ask if the caller wants to play a game and instruct the caller to press ten for yes or two for no. If the caller presses ten for yes, the gaming/interaction service provider assembles other callers with similar wait times and then starts a game.

At the end of a game the gaming/interaction service provider may award a prize to a game winner. The gaming/interaction service provider may fund the prizes by, for example, playing 20-30 second audio advertisements, which are provided by another service, to callers prior to the start of a game.

For talking to other callers in a hold queue in the land-line telephony implementation, illustrative embodiments may ask a caller if the caller wants to discuss a particular category. For example, illustrative embodiments may prompt the caller to press one for weather, two for sports, three for current events, and four for family, etc. If the caller makes a selection for a particular category, illustrative embodiments may temporarily route the call to a separate "chatroom" line based on that selected category.

In an IP telephony implementation, illustrative embodiments may, for example, integrate Skype™ with Yahoo!® games. Consequently, this implementation may automatically bring up a game for callers with similar estimated wait times in a hold queue. With regard to a talking interaction, a chatroom may be created on demand for different subject categories. In addition, a user/caller may select which chatroom to join or may define a new subject category and have others in the hold queue join in.

Figure 2A:
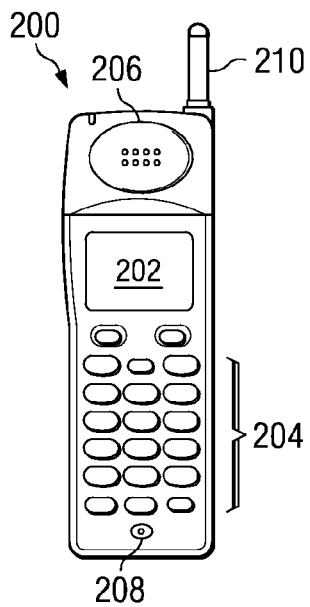
FIG. 2A is a pictorial representation of a communication device in which illustrative embodiments may be implemented.

With reference now to FIG. 2A, a pictorial representation of a communication device is depicted in which illustrative embodiments may be implemented. In the illustrative example of FIG. 2A, communication device 200 is a cellular telephone. However, illustrative embodiments may utilize any type of communication device to accomplish processes of illustrative embodiments. Communication device 200 may, for example, be communication device 140 in FIG. 1.

Communication device 200 includes display 202 to present textual and graphical information to a user. Display 202 may be a known display device, such as a liquid crystal display (LCD). Communication device 200 also includes keypad 204, speaker 206, and microphone 208. Keypad 204 may be utilized to enter telephone numbers, user identification information, and commands for interacting with the interface. Audio feedback may be presented via speaker 206. Microphone 208 may be used not only for voice communication, but also for entering specific voice commands for voice actuated functions. Further, communication device 200 uses antenna 210 to establish wireless communication links with a network, such as, for example, network 110 in FIG. 1. However, it should be noted that even though antenna 210 is shown as an external antenna in FIG. 2A, antenna 210 may represent an internal antenna as well.

Figure 2B:
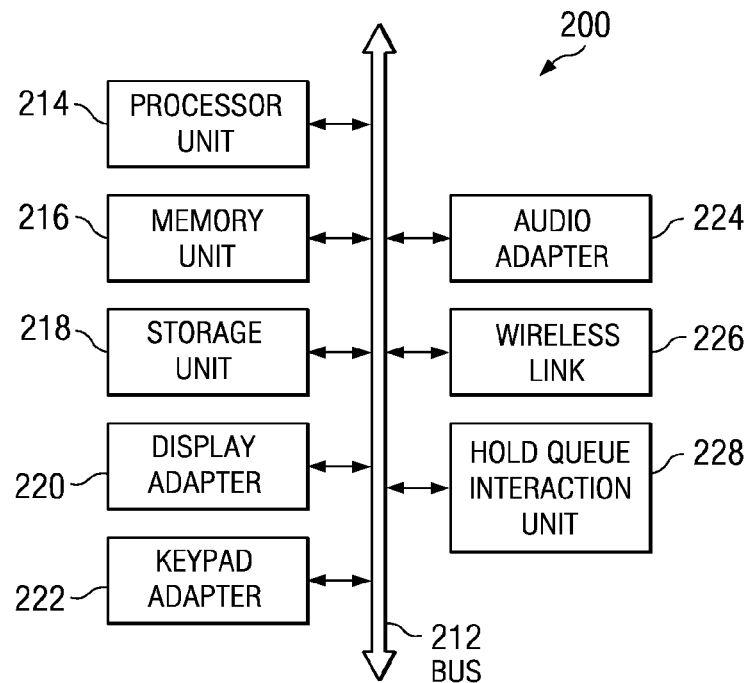
FIG. 2B is a block diagram of a communication device in accordance with an illustrative embodiment.

With reference now to FIG. 2B, a block diagram of a communication device is depicted in accordance with an illustrative embodiment. In the illustrative example of FIG. 2B, communication device 200 utilizes a bus architecture, such as bus 212. Bus 212 may include one or more buses. In addition, bus 212 may be implemented using any type of communication fabric or architecture that provides for a transfer of data between the different components or devices coupled to bus 212.

Communication device 200 includes processor unit 214, memory unit 216, storage unit 218, display adapter 220, keypad adapter 222, audio adapter 224, wireless link 226, and hold queue interaction unit 228, which also are connected to bus 212. However, it should be noted that communication device 200 is only shown for exemplary purposes and is not meant as an architectural limitation to illustrative embodiments. Communication device 200 may include more or fewer components as necessary to perform processes of illustrative embodiments.

Processor unit 214 provides the data processing capabilities of communication device 200. An operating system runs on processor unit 214 and coordinates and provides control of various components within communication device 200. In addition, software applications executing on communication device 200 may run in conjunction with the operating system.

Storage unit 218 is a non-volatile storage device that may, for example, be configured as read only memory (ROM) and/or flash ROM to provide the non-volatile memory for storing the operating system and/or user-generated data. Storage unit 218 also stores instructions or computer usable program code for the operating system and applications. The instructions are loaded into memory unit 216 for execution by processor unit 214. Processor unit 214 performs processes of illustrative embodiments by executing the computer usable program code that is loaded into memory unit 216.

The user-generated data stored in storage unit 218 may, for example, include data inputted by the user, such as user profile information, contact names, addresses, descriptions, telephone numbers, e-mail addresses, instant messaging screen names, and the like. The user profile information may, for example, include the user's name, address, e-mail address, and instant messaging screen name. Furthermore, the user profile information may include other personal and demographic information, such as the user's sex, age, hobbies, community activities, income, personal likes and dislikes, etc.

In addition, the user also may create a user interaction profile within the general user profile information. The user interaction profile may include information regarding a plurality of different queues, wait times in a queue, interaction categories, and connection types. For example, the user may specify in the user interaction profile that if the queue wait time is less than five minutes, then the queue system is to load certain interaction categories or menu selections. As another example, if the queue wait time is more than ten minutes and the connection is VOIP, then the queue system is to load the user's instant messaging, as well as on-line gaming options. As a further example, if the queue wait time is more than five minutes, the previous chat group that helped the user solve a technical problem in two minutes is on-line and available, and the user needs help with the same problem, then the queue system is to connect the user with the same chat group.

However, it should be noted that communication device 200 may store this user-generated data in a remote storage device, such as, for example, storage 170 in FIG. 1, in addition to or instead of storage unit 218. In addition, storage unit 218 may contain any data necessary for processes of illustrative embodiments to provide real time interaction among communication device users waiting in a hold queue system.

Communication device 200 utilizes hold queue interaction unit 228 to interact with a hold queue interaction system. These interactive capabilities provided by hold queue interaction unit 228 allow a user of communication device 200 to interact, either by game or chat, with other users of communication devices equipped with illustrative embodiments that are waiting in a hold queue system. It should be noted that a user of communication device 200 may enable and disable hold queue interaction unit 228 independently of other communication device 200 functions and features. Furthermore, it should be noted that hold queue interaction unit 228 may be implemented entirely as software, hardware, or as a combination of software and hardware components.

Wireless link 226 may, for example, utilize shortwave, high frequency, ultra high frequency, microwave, wireless fidelity (Wi-Fi™), Bluetooth®, or any other wireless communication means to establish a wireless communication link for communication device 200. Communication device 200 also may rely on wireless application protocol (WAP) for facilitating communications. Wireless application protocol is a standard for providing wireless phones, pagers, and other handheld devices with secure access to e-mail and text-based Web pages. Wireless application protocol provides a complete environment for wireless applications that includes a wireless counterpart of TCP/IP and a framework for telephony integration, such as call control and phone book access. Wireless application protocol features the wireless markup language (WML), which was derived from Phone.com's handheld device markup language (HDML) and is a streamlined version of hypertext markup language (HTML) for small screen displays. Also, wireless application protocol uses WML-Script, a compact JavaScript-like language that runs in limited memory. Additionally, wireless application protocol supports handheld input methods, such as keypad and voice recognition.

Wireless application protocol runs over all the major wireless networks now in place. Also, wireless application protocol is device independent, requiring only a minimum functionality in the unit so that it may be used with a myriad of cellular phones and handheld devices. However, it should be pointed out that wireless application protocol has been described for illustrative purposes, and other wireless protocols may be used to implement illustrative embodiments.

Those of ordinary skill in the art will appreciate that the hardware in FIG. 2A and FIG. 2B may vary depending on implementation of illustrative embodiments. Other internal hardware or peripheral devices may be used in addition to or in place of the hardware depicted in FIG. 2A and FIG. 2B. For example, communication device 200 also may include a voice recognition system in order to perform functions activated by user voice command.

With reference now to FIG. 3, an exemplary illustration of caller interactive queue system is depicted in accordance with an illustrative embodiment. Caller interaction system 300 may be implemented in network data processing system 100 in FIG. 1. Caller interaction system 300 may, for example, be utilized by a cellular telephone SP network to provide customer service to customers calling the cellular telephone SP network about cellular telephone service or technical support. However, it should be noted that queue system 302 may be utilized by any type of business or entity.

Caller interaction system 300 includes queue system 302 and interactive system 304. Queue system 302 and interactive system 304 are coupled together via wire or wireless means. Queue system 302 is a system that provides hold queue capabilities for caller interaction system 300. Queue system 302 may represent any type of hold queue. In addition, queue system 302 may represent a plurality of different hold queues.

It should be noted that queue system 302 may receive calls from any type communication device, such as, for example, cell phones, land phones, PDAs, VOIPs, and the like. However, it should also be noted that queue system 302 is independent of the communication device type. In other words, any communication device may connect to a single queue.

Moreover, queue system 302 may connect callers from a plurality of different queues together. In other words, illustrative embodiments are not restricted to just being utilized in only one queue. Cross-queue user interaction is possible. Cross-queue interaction is the interaction among callers in the plurality of different queues. For example, the system administrator may specify which queues may be connected, monitored, and loaded together. This cross-queue user interaction also may be based on criteria, such as queue wait time, user profile, interaction categories, and connection types.

Further, queue system 302 includes plurality of customer service representatives 306. Plurality of customer service representatives 306 provide customer service to plurality of callers 308. Plurality of callers 308 may connect with plurality of customer service representatives 306 via queue system 302 using a communication device, such as, for example, communication device 130 or 140 in FIG. 1.

Interactive system 304 is a system that provides interactive services, such as, for example, chatting and gaming, to plurality of callers 308. Interactive system 304 provides these interactive services to plurality of callers 308 as plurality of callers 308 wait in queue system 302 for the next available customer service representative in plurality of customer service representatives 306 to answer their call. However, it should be noted that plurality of callers 308 have the option to use interactive system 304 or not while waiting in queue system 302.

Figure 4B:
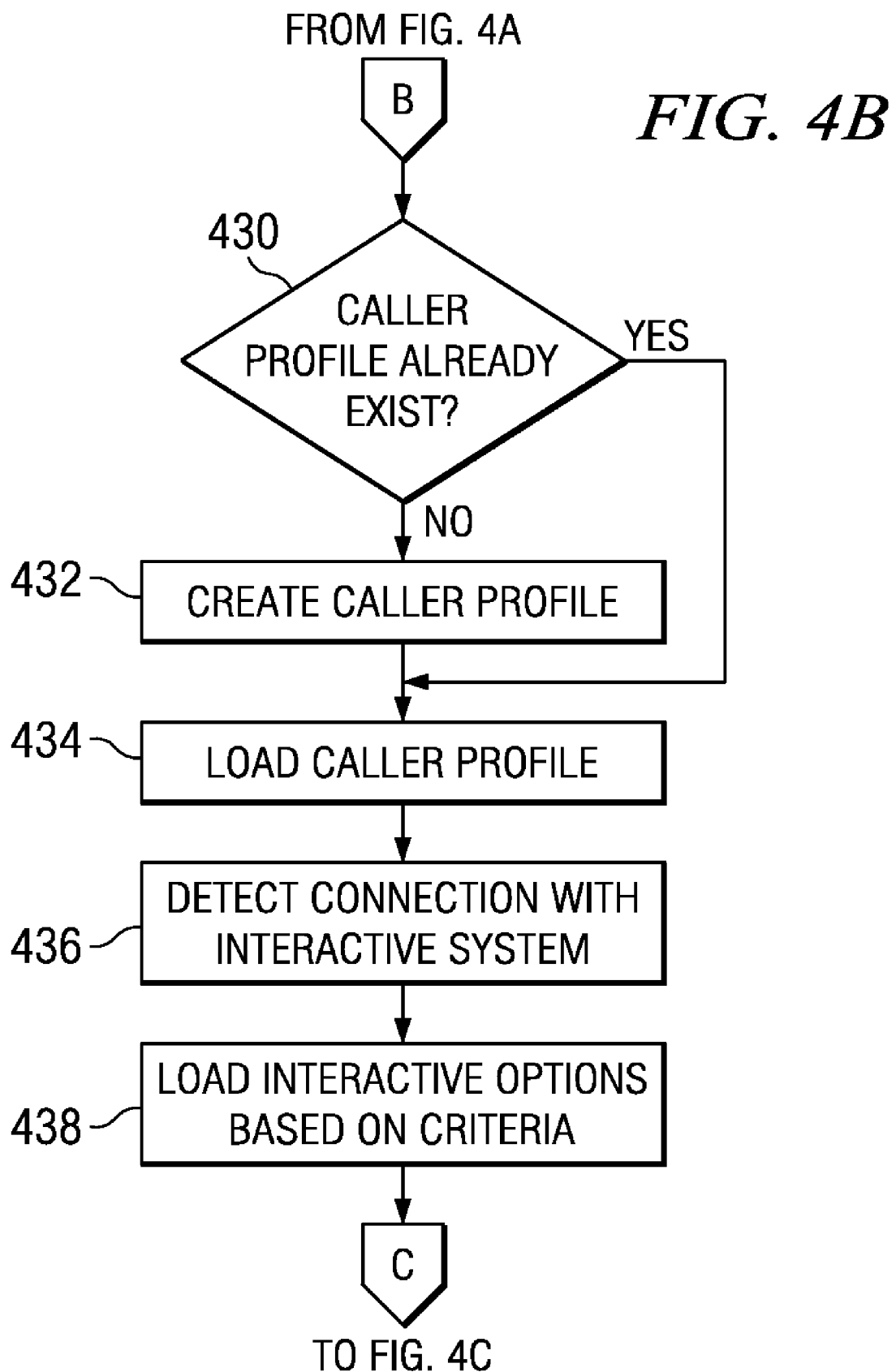
Figure 4C:
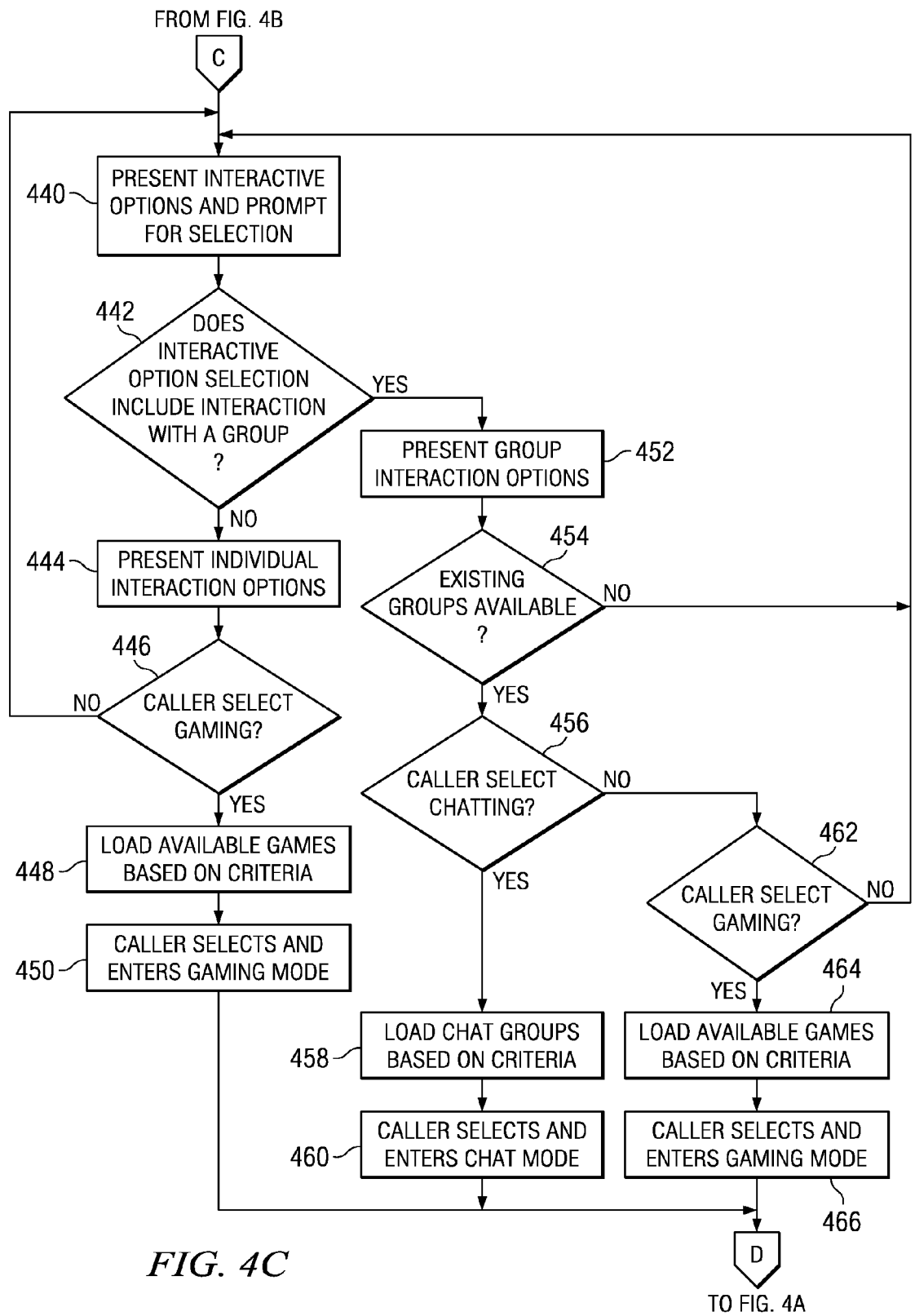

With reference now to FIGS. 4A-4C, diagrams of a flowchart illustrating an exemplary process for providing an interactive system to communication device users waiting in a queue system are shown in accordance with an illustrative embodiment. The process shown in FIGS. 4A-4C may be implemented in a caller interaction system, such as, for example, caller interaction system 300 in FIG. 3.

The process begins when the caller interaction system utilizes a queue system, such as queue system 302 in FIG. 3, to receive a call from a caller, such as one of plurality of callers 308 in FIG. 3, using a communication device, such as communication device 200 in FIG. 2A (step 402). After receiving the call in step 402, the queue system makes a determination as to whether caller information is required (step 404). If caller information is required, yes output of step 404, then the queue system receives personal information from the caller (step 406) and the process proceeds to step 408 thereafter. If caller information is not required, no output of step 404, then the queue system receives menu choices from the caller (step 408).

Subsequent to receiving the menu choices for the caller in step 408, the queue system makes a determination as to whether a wait time exists in the queue system (step 410). If a wait time does not exist in the queue system, no output of step 410, then the queue system connects the caller with the next available customer service representative, such as one of plurality of customer service representatives 306 in FIG. 3 (step 412). The caller may, for example, be connected with a customer service representative based on the need of the caller. The process terminates thereafter.

If a wait time does exist in the queue system, yes output of step 410, then the queue system makes a determination as to whether the caller is interested in an interaction mode (step 414). If the caller is not interested in an interaction mode, no output of step 414, then the queue system places the caller in a "normal" hold queue (step 416). After placing the caller in a normal hold queue, the process returns to step 410 where the system queue makes a determination as to whether a wait time exists in the queue system. However, it should be noted that while the caller waits in the normal hold queue, the queue system may at predetermined time intervals ask the caller if the caller is interested in the interaction mode. The number of caller prompts is configurable by, for example, a system administrator.

If the caller is interested in the interaction mode, yes output of step 414, then the queue system continuously monitors hold queue wait time or for caller interrupt of the process (step 418). In addition, if the caller is interested in the interaction mode, then the queue system may offer the caller an option to learn more about the interaction mode. While continuously monitoring the hold queue wait time for the caller in step 418, the queue system makes a determination as to whether the hold queue wait time is less than a predetermined alert time (step 420). In this particular example, the predetermined alert time is three minutes. However, it should be noted that the system administrator may set the alert time to any time interval. In other words, the time interval is configurable by the system administrator.

If the hold queue wait time is not less than three minutes, no output of step 420, then the process proceeds to step 426 where the caller continues in the interaction mode. If the hold queue wait time is less than three minutes, yes output of step 420, then the system queue alerts the caller and prompts the caller for a selection to continue in the interaction mode (step 422). After alerting and prompting the caller in step 422, the queue system makes a determination as to whether the caller wants to continue in the interaction mode (step 424).

If the caller does not want to continue in the interaction mode, no output of step 424, then the process returns to step 412 where the system queue connects the caller with the next available customer service representative. If the caller does want to continue in the interaction mode, yes output of step 424, then the queue system allows the caller to continue in the interaction mode (step 426). Then, the queue system makes a determination as to whether the caller is already in an interactive session, such as, for example, a game or a chat (step 428).

If the caller is already in an interactive session, yes output of step 428, then the process returns to step 420 where the queue system makes a determination as to whether the hold queue time is less than three minutes. If the caller is not already in an interactive session, no output of step 428, then the queue system makes a determination as to whether a profile for the caller already exists (step 430). If a profile for the caller does not already exist, no output of step 430, then the queue system creates a profile for the caller from information, such as, for example, demographics and personal interests, obtained from the caller (step 432) and the process proceeds to step 434 thereafter. If a profile for the caller does already exist, yes output of step 430, then the queue system loads the caller profile (step 434).

After loading the caller profile in step 434, the queue system detects a connection with an interactive system, such as, for example, interactive system 304 in FIG. 3 (step 436). Then, the queue system loads interactive options from the interactive system based on criteria, such as, for example, caller profile information, preference settings, wait time in queue, and type of communication connection (step 438). The type of communication connection may, for example, be an Internet type connection or a landline type connection. Subsequent to loading the interactive options in step 438, the queue system presents the interactive options, either via a display, such as display 202 in FIG. 2A, or via a speaker, such as speaker 206 in FIG. 2A, to the caller and prompts the caller for a selection from the interactive options (step 440).

After prompting the caller for a selection from the interactive options in step 440, the queue system makes a determination as to whether the interactive option selection by the caller includes interaction with a group (step 442). If the interactive option selection does not include interaction with a group, no output of step 442, then the queue system presents individual interaction options to the caller (step 444). Subsequently, the queue system makes a determination as to whether the caller selects gaming (step 446).

If the caller does not select gaming, no output of step 446, then the process returns to step 440 where the queue system presents the caller with interactive options and prompts for selection. If the caller does select gaming, yes output of step 446, then the queue system loads available individual games (step 448). The queue system may load games based on the criteria, such as the caller profile, preference settings, wait time in queue, and type of communication connection. In addition, illustrative embodiments may utilize a mapping database to match the criteria with optimal gaming choices. Afterward, the caller selects an available individual game and enters a gaming mode (step 450). The process returns to step 420 thereafter, where the queue system makes a determination as to whether hold queue time is less than three minutes.

Returning now to step 442, if the interactive option selection does include interaction with a group, yes output of step 442, then the queue system presents group interaction options to the caller (step 452). Subsequent to presenting group interaction options to the caller in step 452, the queue system makes a determination as to whether existing groups are available (step 454). If existing groups are not available, no output of step 454, then the process returns to step 440 where the queue system presents interactive options and prompts for selection. If existing groups are available, yes output of step 454, then the queue system makes a determination as to whether the caller selects chatting (step 456).

If the caller does select chatting, yes output of step 456, then the queue system loads chat groups based on the criteria (step 458). Afterward, the caller selects a chat session and enters a chatting mode (step 460). The process returns to step 420 thereafter, where the queue system makes a determination as to whether hold queue time is less than three minutes. If the caller does not select chatting, no output of step 456, then the queue system makes a determination as to whether the caller selects gaming (step 462). If the caller does not select gaming, no output of step 462, then the process returns to step 440 where the queue system presents interactive options and prompts for selection. If the caller does select gaming, yes output of step 462, then the queue system loads available group games based on the criteria (step 464). Subsequently, the caller selects a group game session and enters a gaming mode (step 466). The process returns to step 420 thereafter, where the queue system makes a determination as to whether hold queue time is less than three minutes.

Thus, illustrative embodiments provide a computer implemented method, system, and computer usable program code for providing interaction among communication device users waiting in a hold queue. The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain or store the program for use by or in connection with the instruction execution system, apparatus, or device.

The medium can be an electronic, magnetic, optical, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing caller interaction within a queue, the computer implemented method comprising:

responsive to receiving a call from a caller, determining if a wait time exists before the caller is connected to a customer service representative;

responsive to determining that the wait time exists, determining if the caller is interested in an interaction;

responsive to determining that the caller is not interested in the interaction, placing the caller in the queue, wherein the caller is asked if the caller is interested in the interaction at predetermined time intervals while the caller continues to wait in the queue after the caller was placed in the queue in response to a determination that the caller was not interested in the interaction;

responsive to determining that the caller is interested in the interaction, loading a profile associated with the caller;

responsive to detecting a connection with an interactive system, loading interactive options from the interactive system based on the profile associated with the caller;

presenting the interactive options to the caller;

responsive to receiving a selection from the interactive options from the caller, determining if the selection includes a group interaction with other callers within the queue;

responsive to determining that the selection includes the group interaction with other callers within the queue, loading the group interaction based on the profile associated with the caller;

entering the caller into the group interaction after receiving consent from the caller to enter the caller into the group interaction, wherein one or more commercial advertisements provided by a third party service are presented to the caller prior to entering the caller into the group interaction;

responsive to monitoring the wait time, determining if the wait time is less than a predetermined alert time; and responsive to determining that the wait time is less than the predetermined alert time, alerting the caller.

2. The computer implemented method of claim 1, further comprising:

responsive to alerting the caller, determining if the caller does not want to continue in the interaction; and responsive to determining that the caller does not want to continue in the interaction, connecting the caller with a next available customer service representative based on a need of the caller.

3. The computer implemented method of claim 2, wherein the determining, loading, presenting, entering, alerting, and connecting steps are performed by a queue system.

4. The computer implemented method of claim 1, wherein the loading steps are based on criteria.

5. The computer implemented method of claim 4, wherein the criteria is at least one of the wait time, preference settings, or type of communication connection.

6. The computer implemented method of claim 1, wherein the interaction is gaming.

7. The computer implemented method of claim 6, wherein at an end of a gaming interaction an interactive system awards a prize to a game winner, and wherein the interactive system funds the prize by presenting the one or more commercial advertisements provided by the third party service to game participants prior to a game start.

8. The computer implemented method of claim 1, wherein the interaction is chatting.

9. The computer implemented method of claim 4, wherein the queue is a plurality of different queues, and wherein the plurality of different queues are connected together for cross-queue interaction among callers within the plurality of different queues based on the criteria.

10. A computer readable storage medium encoded with computer usable program code that is executable by a computer for providing caller interaction within a queue, the computer readable storage medium comprising:
   computer usable program code configured to determine if a wait time exists before a caller is connected to a customer service representative in response to receiving a call from the caller;
   computer usable program code configured to determine if the caller is interested in an interaction in response to determining that the wait time exists;
   computer usable program code configured to place the caller in the queue in response to determining that the caller is not interested in the interaction, wherein the caller is asked if the caller is interested in the interaction at predetermined time intervals while the caller continues to wait in the queue after the caller was placed in the queue in response to a determination that the caller was not interested in the interaction;
   computer usable program code configured to load a profile associated with the caller in response to determining that the caller is interested in the interaction;
   computer usable program code configured to load interactive options from an interactive system based on the profile associated with the caller in response to detecting a connection with the interactive system;
   computer usable program code configured to present the interactive options to the caller;
   computer usable program code configured to determine if a selection from the interactive options from the caller includes a group interaction with other callers within the queue in response to receiving the selection;
   computer usable program code configured to load the group interaction based on the profile associated with the caller in response to determining that the selection includes the group interaction with other callers within the queue;
   computer usable program code configured to enter the caller into the group interaction after receiving consent from the caller to enter the caller into the group interaction, wherein one or more commercial advertisements provided by a third party service are presented to the caller prior to entering the caller into the group interaction;
   computer usable program code configured to determine if the wait time is less than a predetermined alert time in response to monitoring the wait time; and
   computer usable program code configured to alert the caller in response to determining that the wait time is less than the predetermined alert time.

11. The computer readable storage medium of claim 10, further comprising:
   computer usable program code configured to determine if the caller does not want to continue in the interaction in response to alerting the caller; and
   computer usable program code configured to connect the caller with a next available customer service representative based on a need of the caller in response to determining that the caller does not want to continue in the interaction.

* * * * *